Feb. 10, 1925.

H. ROSENBERG

SCREW

Filed July 22, 1921

1,526,182

Inventor
Heyman Rosenberg,
By Edgar M. Kitchin
Attorney

Patented Feb. 10, 1925.

1,526,182

UNITED STATES PATENT OFFICE.

HEYMAN ROSENBERG, OF NEW YORK, N. Y.

SCREW.

Application filed July 22, 1921. Serial No. 486,668.

*To all whom it may concern:*

Be it known that I, HEYMAN ROSENBERG, a citizen of the United States, residing at New York, in the county of New York and State of New York, have invented certain new and useful Improvements in Screws; and I do hereby declare the following to be a full, clear, and exact description of the invention, such as will enable others skilled in the art to which it appertains to make and use the same.

This invention relates to improvements in the art of anchorage devices, and more particularly to such as are especially employed for connecting an article, such as a name plate, to the frame of a machine or other metallic body.

The object in view is the improvement of this class of devices in the matter of ease and accuracy of application and final location of the respective connecting screw.

With this and further objects in view as will in part hereinafter become apparent and in part be stated, the invention comprises certain novel constructions, combinations and arrangements of parts as subsequently specified and claimed.

In the accompanying drawings,—

Figure 1:
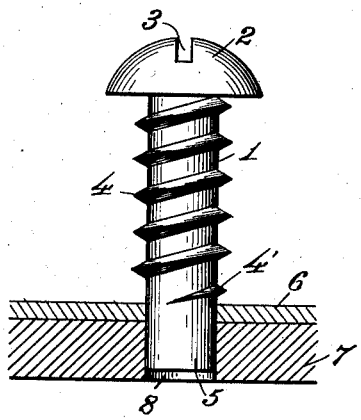
Figure 1 is a view in side elevation of a screw embodying the features of the present invention, the screw being illustrated in the initial position of introduction into plates for connecting two plates, the plates being seen in section.

Referring to the drawings by numerals, 1 indicates the cylindrical body or shank of a screw having a head 2 formed with a kerf 3. Outstanding from the body 1 is the thread 4 of relatively low pitch, corresponding substantially to that of an ordinary wood screw. The thread 4 terminates short of the inner end of shank 1, that is, the end opposite head 2, leaving a cylindrical extension 5, which, because of its function, I designate a pilot. The thread 4 terminates short of the pilot 5 and tapers at 4' until it blends smoothly into the body 1. In other words, the thread 4 rises with a gentle, gradual slope along the portion 4' from the point where it corresponds with and is continuous of the smooth portion of body 1 along the length of the thread until it reaches the full width of the thread at approximately three-quarters of a helix about the body 1. The terminal portion 4', having the edge of the thread extended to the body 1, presents a cutting or entering end for parting the material which it enters.

Figure 2:
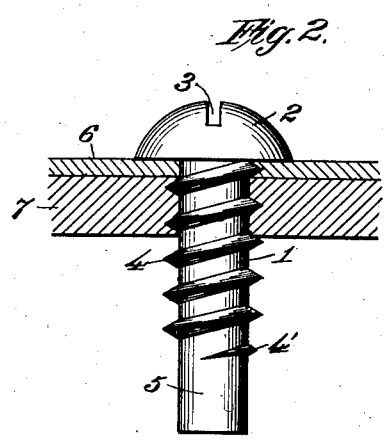
Figure 2 is a view similar to Figure 1 with the screw in its final position.
Figure 3:
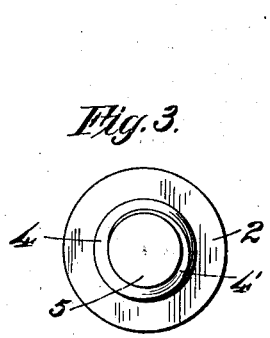
Figure 3 is an end view of the screw detached.

The screw is adapted for connecting any plates of relatively soft metal, such as soft iron or soft steel, and, in operation, the plates, as seen at 6 and 7, are drilled or otherwise formed with alined pasages or apertures 8 of the same diameter as the diameter of the pilot 5, which is the same as the body 1. The screw is applied after the plates 6 and 7 have been assembled, and the aperture 8 formed therethrough by having the pilot 5 introduced into the aperture 8. As the pilot 5 snugly fits the aperture, it will serve as an effective guide to retain the screw with its axis at right angles to the planes of the face of the plates, so that advance movement of the screw will be exactly on a rectilinear path and there is no danger of canting or tilting of the screw so as to give an unsightly slant to the parts when the screw head reaches a point where it contacts with the plate 6. Being in the initial position, as indicated in Figure 1, the screw is revolved while pressure is applied axially thereof, as by the use of a screw driver, and the tapered tip of the section 4' of thread 4 begins to cut its way into the material of the plates 6 and 7. Continued movement of the screw causes the thread to enter until a full width of thread is reached, and then rotation is continued until the screw is completely seated, as indicated in Figure 2. The taper of the portion 4' of the thread effects a gradual cutting of the material of the plates being connected, and particularly of plate 7, so that a minimum resistance is offered to the advance of the screw, and the cutting of the thread in the material engaged is effected in a smooth and perfect manner.

Figure 4:
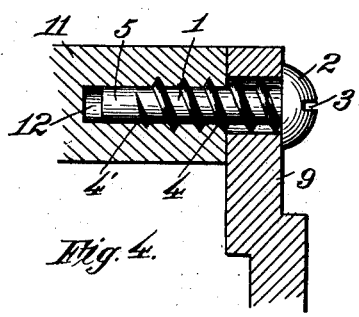
Figure 4 is a fragmentary section through an instrument casing whose plates are connected by the present improved screw.

The screw is especially well adapted for connecting parts of gas stoves or for sheet iron, cornices, and the like, and is particularly well designed for use with die castings and heavy plates. In Figure 4 is shown a practical application of the screw to an instrument casing wherein the face plate 9 is secured to the body 11 by the screw 1. It will be noted that in structures of this type, the aperture or recess in the body 11 is drilled out at 12 to an extent for freely accommodating the screw body 1 and its pilot 5, and the apertures through the plates 9 are made sufficiently large to accommodate the threads 4 as well as the body 1, so that the beginning of the engagement of the thread is in the material of the part 11.

It will be observed that the parts may be disconnected by the withdrawal of the screw, but by experience I find that the screw does not accidentally loosen or become detached. The fact that the screw cuts its co-operating thread by severing the metal of the engaged part and forcing it to flow to form an engaging or internal thread as the screw is being seated gives the screw such a grip on the engaged plate or plates as to obviate any liability of loosening accidentally. Also the action of the pilot 5 in keeping the screw absolutely straight prevents any possibility of the stripping of the thread, such as sometimes occurs with previously known screws when allowed to enter in a canted position.

What is claimed is:—

1. A screw of the class described comprising a body, and a hardened thread, the body having a smooth portion extending beyond the thread, the thread being formed with substantially equal, inclined faces, and the terminal portion of the thread at the smooth portion having a cutting edge extending along the middle of the thread, and the thread being of such pitch that the said cutting edge travels substantially longitudinally with respect to itself when the screw is revolved.

2. A screw of the class described comprising a cylindrical body and a hardened thread thereon, the body having an unthreaded portion extending beyond the thread, and the thread having a terminal cutting edge adjacent the unthreaded portion facing endwise from the thread and adapted to cut its way into metal for forming a passage for the entry of the thread.

3. A screw of the class described comprising a body and a hardened thread, the body extending beyond the thread to form a pilot of the same diameter as that of the main portion of the body, the thread being of such low pitch as to have its terminal portion at the pilot located to travel substantially longitudinally with respect to itself when the screw is revolved.

In testimony whereof I affix my signature in presence of two witnesses.

HEYMAN ROSENBERG.

Witnesses:
THOMAS J. BURNS,
W. C. POWELL.